(12) United States Patent
Blumenstock et al.

(10) Patent No.: US 6,313,555 B1
(45) Date of Patent: Nov. 6, 2001

(54) LOW LOSS POLE CONFIGURATION FOR MULTI-POLE HOMOPOLAR MAGNETIC BEARINGS

(75) Inventors: Kenneth A. Blumenstock, College Park; Claef F. Hakun, Dunkirk, both of MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/376,001

(22) Filed: Aug. 19, 1999

Related U.S. Application Data
(60) Provisional application No. 60/097,083, filed on Aug. 19, 1998.

(51) Int. Cl.[7] ..................................................... H02K 7/09
(52) U.S. Cl. ......................... 310/90.5; 310/178; 310/254; 310/181
(58) Field of Search ................................ 310/90.5, 178, 310/254, 256, 179, 180, 181, 190, 216, 186, 187

(56) References Cited

U.S. PATENT DOCUMENTS

| | | | |
|---|---|---|---|
| 4,082,376 | 4/1978 | Wehde et al. | 308/10 |
| 4,387,935 | 6/1983 | Studer | 308/10 |
| 5,111,102 | * 5/1992 | Meeks | 310/90.5 |
| 5,319,273 | * 6/1994 | Hockney et al. | 310/90.5 |
| 5,942,829 | * 8/1999 | Huynh | 310/90.5 |
| 5,962,940 | * 10/1999 | Imlach | 310/90.5 |

* cited by examiner

*Primary Examiner*—Burton S. Mullins

(57) ABSTRACT

A new pole configuration for multi-pole homopolar bearings proposed in this invention reduces rotational losses caused by eddy-currents generated when non-uniform flux distributions exist along the rotor surfaces. The new homopolar magnetic bearing includes a stator with reduced pole-to-pole and exhibits a much more uniform rotor flux than with large pole-to-pole gaps. A pole feature called a pole-link is incorporated into the low-loss poles to provide a uniform pole-to-pole gap and a controlled path for pole-to-pole flux. In order to implement the low-loss pole configuration of magnetic bearings with small pole-to-pole gaps, a new stator configuration was developed to facilitate installation of coil windings. The stator was divided into sector shaped pieces, as many pieces as there are poles. Each sector-shaped pole-piece can be wound on a standard coil winding machine, and it is practical to wind precision layer wound coils. To achieve maximum actuation efficiency, it is desirable to use all the available space for the coil formed by the natural geometric configuration. Then, the coils can be wound in a tapered shape. After winding, the sectored-pole-pieces are installed into and fastened by bonding or other means, to a ring of material which encloses the sectored-pole-pieces, forming a complete stator.

14 Claims, 7 Drawing Sheets

LOW LOSS POLE CONFIGURATION FOR MULTI-POLE HOMOPOLAR MAGNETIC BEARINGS

CROSS-REFERENCES TO RELATED APPLICATIONS

This application now formalizes and incorporates herein by reference U.S. Provisional Application Ser. No. 60/097,083, "LOW LOSS POLE CONFIGURATION FOR MULTI-POLE HOMOPOLAR MAGNETIC BEARING" Kenneth A. Blumenstock et al., filed on Aug. 19, 1998. Applicant claims the priority date thereof under 35 U.S.C. 119(e).

ORIGIN OF THE INVENTION

The invention described herein was made by employees of the United States Government. The invention may be manufactured and used by or for the Government for governmental purposes without the payment of royalties thereon or therefor.

FIELD OF THE INVENTION

The present invention relates to magnetic bearings and more particularly to a low-loss pole configuration thereof.

BACKGROUND OF THE INVENTION

A magnetic bearing, which includes a rotor and a stator concentrically located with respect to each other, typically controls the radial or axial distance between the rotating rotor and the stationary stator. More specifically, adjustable electro-magnetic forces generated by current flowing through coils wrapped around the stator poles, as controlled by a control circuit adjusts distances between the stator and rotor. U.S. Pat. No. 4,387,935 and 4,082,376 describe details of the magnetic bearing.

Although superior to mechanical bearings in terms of rotational losses, magnetic bearings exhibit rotational losses caused mainly by eddy-current losses generated when non-uniform flux distributions exist along the rotor surface. A heteropolar magnetic bearing requires reversal of the magnetic bias-flux direction as seen by the rotor at each stator pole location resulting in a greatly varying flux distribution around the rotor. Laminated soft-magnetic material is commonly used for the rotor construction to reduce eddy-current losses.

Homopolar magnetic bearings are known to minimize these losses by utilizing two stators: one feeds magnetic bias flux into its rotor and the other feeds magnetic bias flux out of its rotor making the flux distributions around the rotors much more uniform than for the heteropolar case. As the rotors rotate, flux reversal, which is inherent in heteropolar magnetic bearings, will then not occur. However, flux levels as seen by the rotors will modulate with rotation because fluxes will drop off at rotor locations between the stator poles. The drop off of flux levels as seen by the rotors will maintain high eddy-current and rotational losses, but these losses will be less than those of heteropolar magnetic bearings.

The pole-to-pole gap of a magnetic bearing is generally orders of magnitude larger than its pole-to-rotor gap. There are two reasons for having a large pole-to-pole spacing. First, in order to develop force, it is necessary for flux to flow from pole to rotor (pole-to-rotor) and from rotor to pole (rotor-to-pole) to an opposing pole. A parallel flux path exists pole-to-pole which will not generate force and waste generated pole flux. Maintaining a relatively large pole-to-pole gap will cause this parallel flux path to have a high reluctance and be insignificant. Second, it is more convenient for assembly to install coil windings into a relatively large pole-to-pole gap.

If the two reasons for having a large pole-to-pole gap can be tolerated or dealt with in some manners, it can be possible to reduce the pole-to-pole gap to create a more uniform rotor flux distribution. This can result in a reduction of eddy-current losses and rotational losses.

Thus, it is an object of this invention to provide a multi-pole homopolar magnetic bearing with uniform rotor flux distribution.

It is a further object of this invention to provide a multi-pole homopolar magnetic bearing that reduces eddy current and rotational losses therein.

It is yet a further object of this invention to provide a multi-pole homopolar magnetic bearing with sectored-pole-pieces.

It is still another object of this invention to provide a multi-pole homopolar magnetic bearing with reduced pole-to-pole gaps in accordance with flux allocation ratio.

SUMMARY

The present invention provides a multi-pole homopolar magnetic bearing pole configuration that reduces rotational losses caused by eddy-current generated when non-uniform flux distributions exist along the rotor surface. As proposed by this invention, a homopolar magnetic bearing with a pole-to-pole gap reduced to the same order as its pole-to-rotor gap exhibits a much more uniform rotor flux than with relatively large pole-to-pole gaps.

The present invention proposes a magnetic bearing with a reduced pole-to-pole gap. The poles are shaped where they meet pole-to-pole so as to form a defined gap with a defined area resulting in a defined reluctance. By shaping the poles so as to form controlled reluctances for non-force producing parallel fluxes which flow from pole-to-pole, it is possible to create a more uniform bias flux distribution while allowing for enough pole-to-pole reluctance to minimize non-force producing parallel fluxes. The pole feature necessary to perform this task is called the pole-link. As the pole-to-pole gap is reduced, the bias flux distribution becomes more uniform, but the parallel reluctance path reduces as well causing more control flux to be wasted in a parallel path resulting from the parallel fluxes which flow from pole to pole. The Actuation Constant (Newtons/$\sqrt{watt}$) of the magnetic bearing will fall to inefficient levels as the parallel reluctance path approaches the reluctance path of the primary force-producing control flux. An optimal design will have pole-links dimensioned such that, for example, 85% to 95% of the control flux will generate force and 5% to 15% of the control flux will be in the parallel path. In this manner, the majority of the flux is used for force, and the pole-to-pole gaps are minimized to ensure a uniform flux distribution on the rotor surface.

As a result of development of a low-loss pole configuration for magnetic bearings which results in a relatively small pole-to-pole gap, it became necessary to develop a new stator configuration to facilitate installation of coil windings. Typical stator designs are single piece units fabricated from a solid or a stack of laminations of soft-magnetic material. U.S. Pat. No. 5,570,503 describes how to make a stator by winding coils on a stack of magnetic materials. If a stator is a single multi-pole unit, each turn of a winding must pass through its pole-to-pole gaps. This process is very tedious to do manually, but special automatic winding equipment developed for motor winding can be utilized. However, it is not practical to wind a precision layer wound coil either manually or with automatic equipment. Precision layer wound coils achieve the highest possible fill factor, thus highest efficiency, and exhibit the highest reliability, especially under severe thermal conditions.

In one preferred embodiment, the stator is divided into sectors, into as many pieces as there are poles, allowing for each coil to be separately wound. In this way, it is possible to mount each sectored-pole-piece onto a standard coil winding machine, and it is practical to wind a precision layer wound coil. For maximum coil efficiency, it is desired to use all the available space for the coil. The coils then can be wound into a tapered shape. After winding, the sectored-pole-pieces are installed into and fastened by bonding or other means, to a ring of material which encloses the sectored-pole-pieces, forming a complete stator.

Many advantages are inherent in this sectored-pole-piece configuration. First, assembly is simplified when small pole-to-pole spacing would inhibit winding of the stator. Second, precision layer winding techniques can be applied, resulting in higher actuation efficiency due to a reduction of resistive losses, and resulting in higher reliability windings necessary for aerospace, cryogenic, and other demanding applications. Third, tapered windings are practical to wind, utilizing the natural geometric space available. This further results in higher actuation efficiency due to a reduction of resistive losses. Fourth, the tapered shape of the sectored-pole-piece restrains the location of each sectored-pole-piece so as to provide proper alignment before and after fastening.

DETAILED DESCRIPTION OF THE INVENTION

Figure 1:
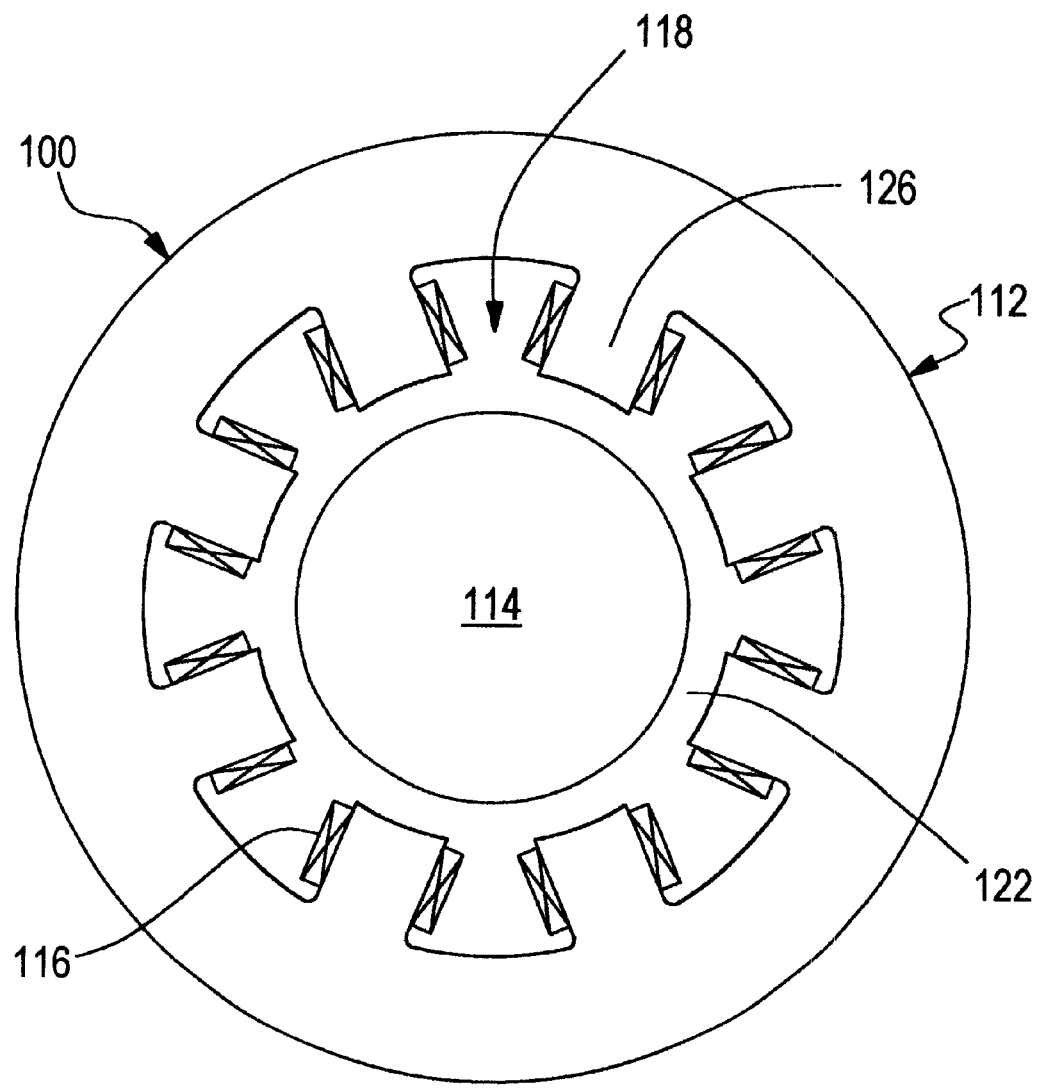
FIG. 1 is a prior-art pole configuration for multi-pole homopolar magnetic bearings.
Figure 2:
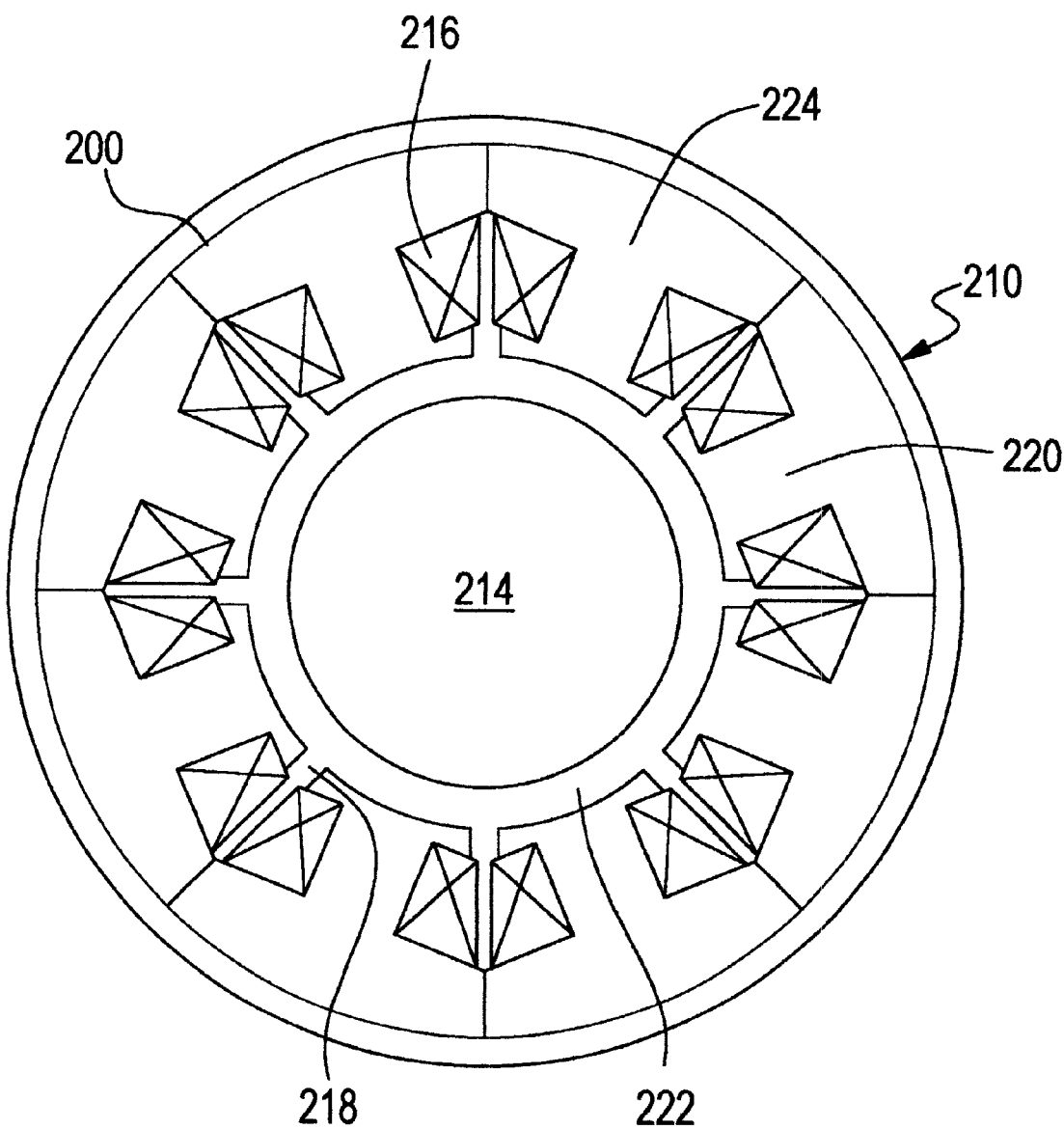
FIG. 2 is a low-loss pole configuration for multi-pole homopolar magnetic bearings proposed by the present invention.

Referring to FIG. 1, the typical pole configuration for prior-art multi-pole homopolar magnetic bearings is such that pole-to-pole gap 118 is generally orders of magnitude larger than pole-to-rotor gap 122. The pole configuration of the low-loss magnetic bearing as shown in FIG. 2 has a pole-to-pole gap 218 which is much closer in size to the pole-to-rotor gap 222. The low-loss poles have a feature called a pole-link 390, which is clearly shown in FIG. 3.

Figure 4:
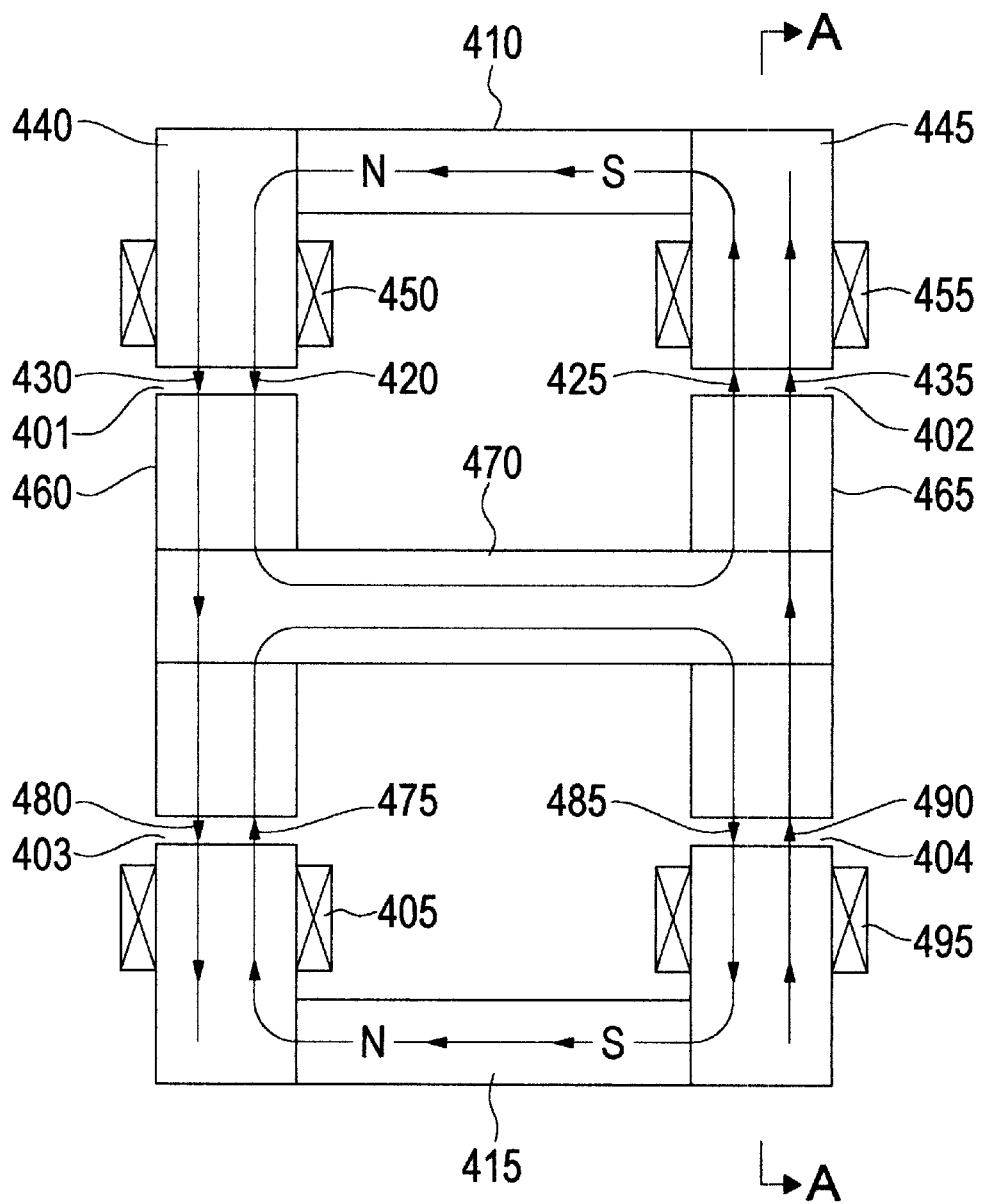
FIG. 4 illustrates the bias and control flux paths for a prior-art homopolar magnetic bearing.
Figure 5:
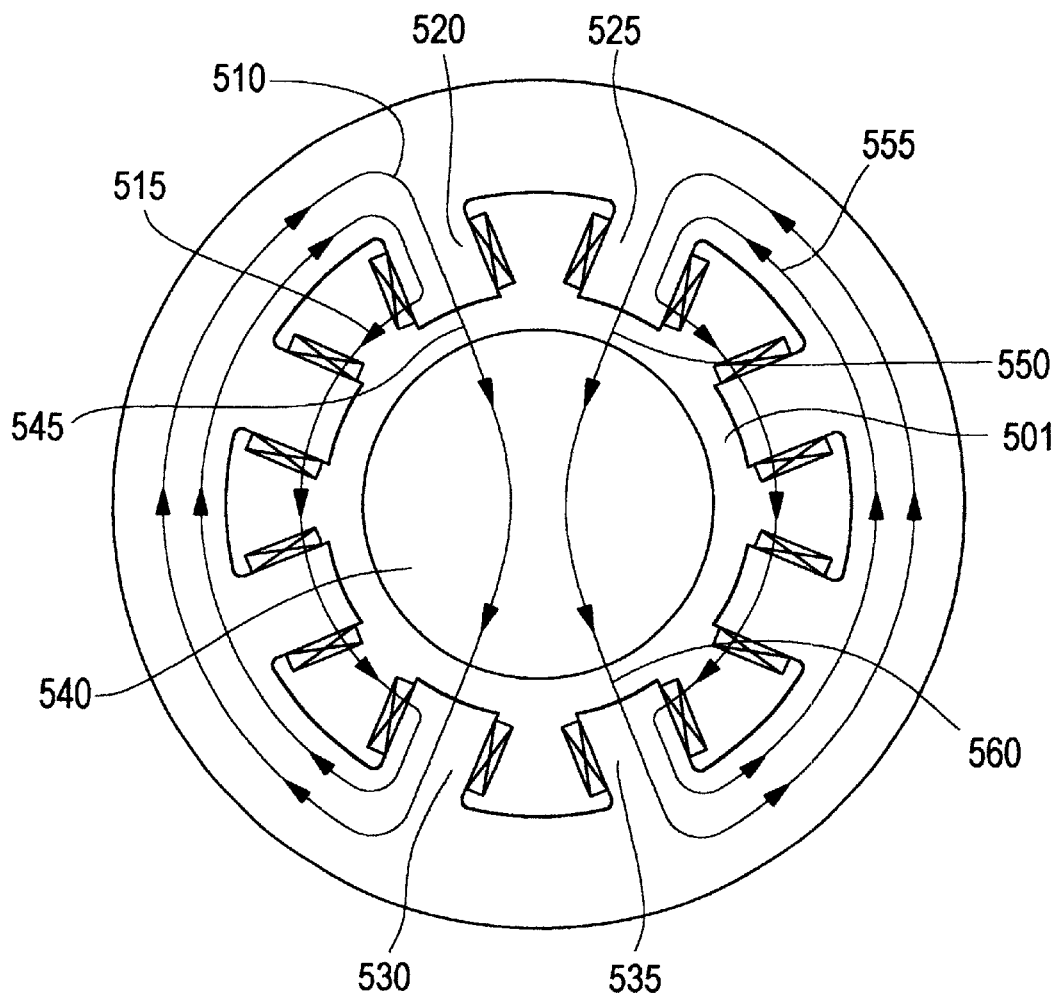
FIG. 5 is a cross-sectional view of the prior-art homopolar magnetic bearing taken along line A—A of FIG. 4 and shows the control flux paths for its stator.

Referring to FIG. 4, a homopolar magnetic bearing has two stators 440,445 with bias magnet 410, 415 between the stators 440, 445. Bias magnets 410, 415 can be individual magnets located in several locations or can be a single ring magnet. It is also possible to implement an electromagnet scheme to supply bias flux. The bias magnet(s) supplies a bias flux which feeds radially inward into stator 440, into rotor 460 through air gaps 401,403, then into a rotating member (shaft) 470, into rotor 465 where the flux flows radially outward through air gaps 402, 404 into the poles of stator 445, and back to bias magnet(s) 410, 415. A control flux 430, 435, 480, 490 generated by coils 450, 455, 405, 495 is used to generate force between the rotors 460, 465 and the 35 stators 440, 445. The control flux 430, 435, 480, 490 is shown to add flux to the bias flux 420, 425 of the upper rotor gaps 401, 402, and to subtract flux from the bias flux 475, 485 of the lower gaps 403, 404. The indicated direction of control flux 430, 435, 480, 490 will cause forces to act upon the rotor 460, 465, which would move it in the upwards direction towards a bias magnet 410 in FIG. 4 if it were free to move. Referring to FIG. 5, the control flux 510, 550 is more clearly shown to flow from poles 520, 525, across air gap 501, into rotor 540 and across air gap 501, into poles 530, 535, returning around the outer perimeter of the stator. Stators with different numbers of poles than depicted in FIG. 5 can be used so long as two force vectors can be generated.

A secondary flux path is generated when the control fluxes are present. It is a parallel flux path 515, 555 that flows pole-to-pole. It is undesirable in that it generates no force. For highest actuation efficiency, it would be best for this flux path to be non-existent. In prior-art designs that have large pole-to-pole spacing, this parallel flux path is negligible.

Figure 6:
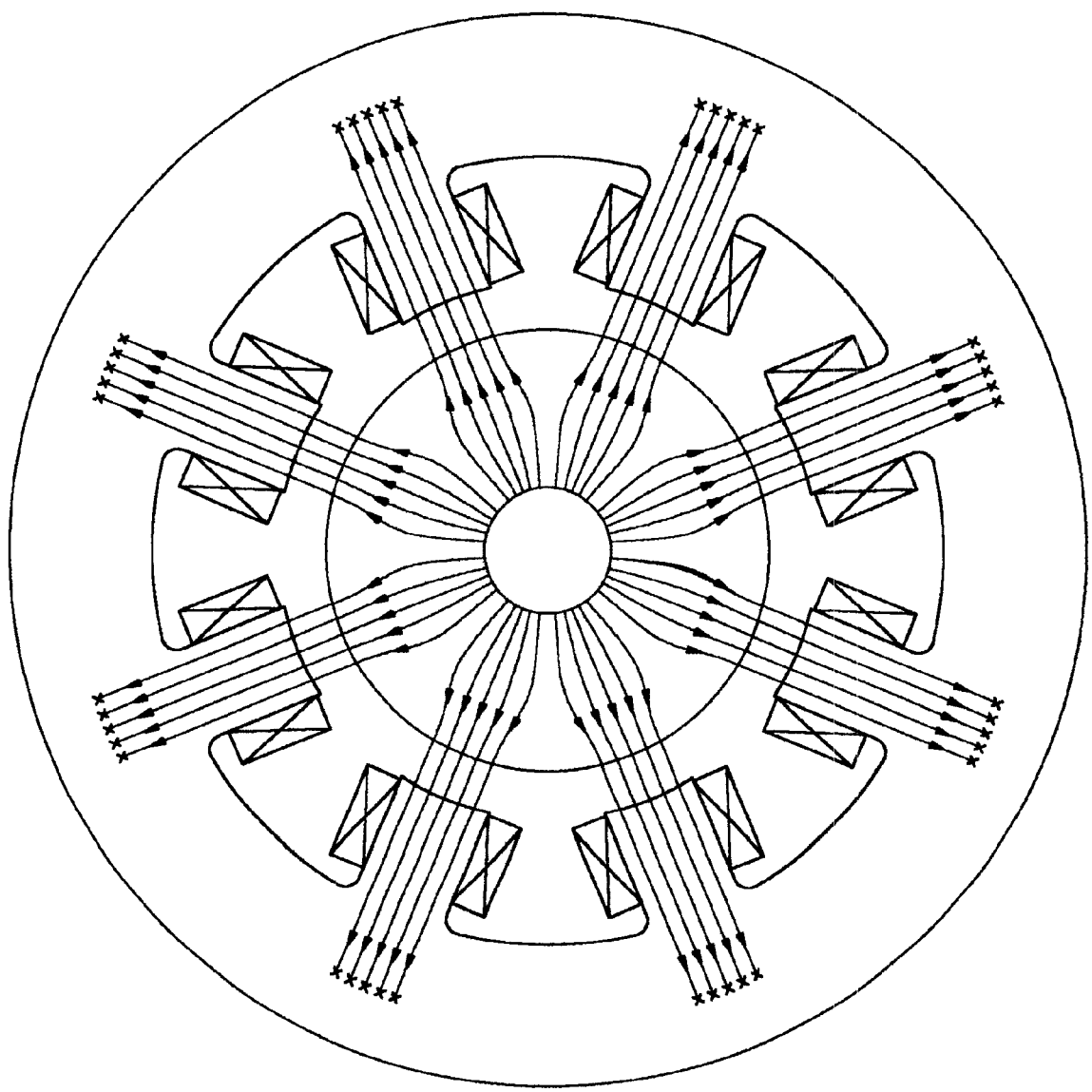
FIG. 6 illustrates the non-uniform flux distribution of a prior-art homopolar magnetic bearing rotor

It is desired that the bias flux form a uniform distribution around the surface of each rotor. Due to the fact that the bias flux flows to or from discrete poles, the flux distribution will be non-uniform around each rotor as shown in FIG. 6. There is a reduction in flux level at rotor locations between each pole. As the rotors rotate, flux modulation will occur in the rotors resulting in eddy-current losses and thus rotational losses.

Figure 3:
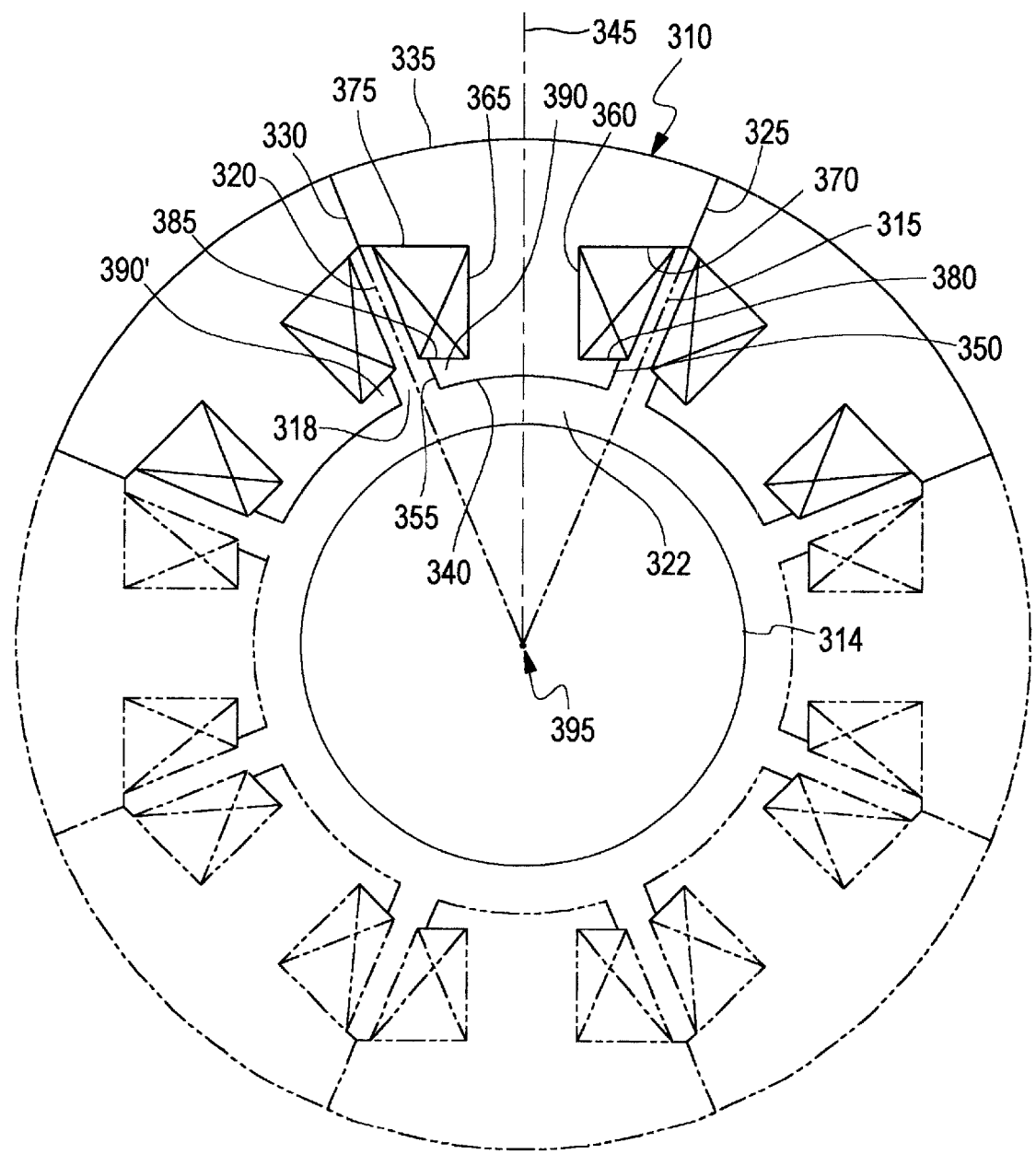
FIG. 3 is a detailed view of the pole-link feature of the low-loss sectored-pole-pieces.

The low-loss pole configuration as shown in FIG. 2 and FIG. 3 operates fundamentally the same as a prior-art homopolar magnetic bearing. However, in order to achieve low rotational loss, a pole feature called a pole-link 390 was incorporated into the pole design.

In order to reduce rotational losses, it is necessary to have a bias flux uniformly distributed around the rotor 214 in FIG. 2. This uniformity would be best if there were no pole-to-pole gap 218, but control fluxes would be compromised with a large amount of the flux diverted to the non-force producing parallel path. The pole-to-pole gap 218 can be reduced such that the parallel flux is no longer negligible, but still small enough so to not adversely reduce the force capability of the magnetic bearing. Since the parallel flux is no longer negligible as in prior-art designs, elements must be designed to carry this intentional parasitic flux from pole-to-pole 218. Pole-links 390 in FIG. 3 are designed for this purpose so that a limited portion of control flux is diverted pole-to-pole while at the same time rotational losses are reduced because the minimized pole-to-pole gaps 318 provides a uniform bias flux distribution around the rotor 314.

Figure 7:
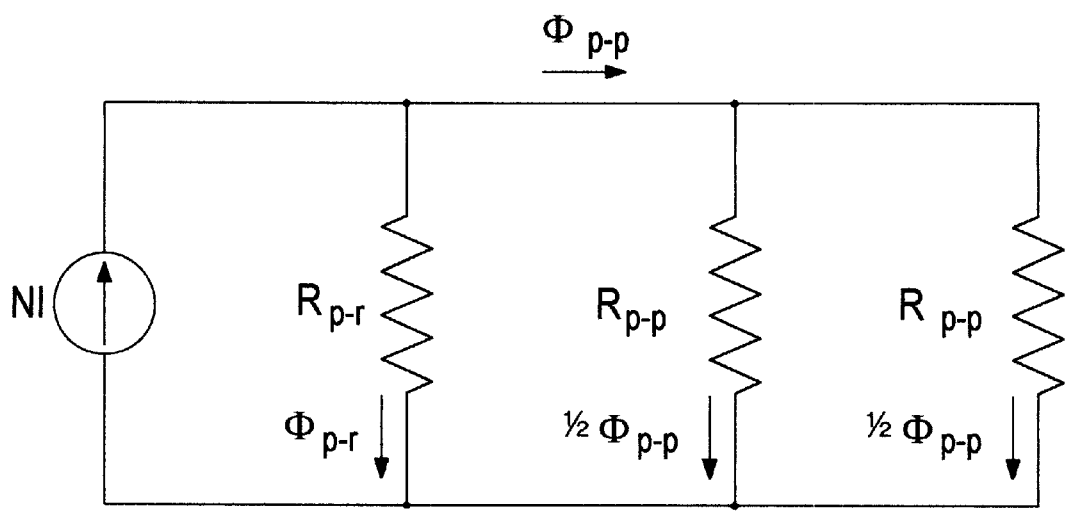
FIG. 7 is a schematic of the magnetic equivalent circuit of a homopolar magnetic bearing with pole-link features.

The pole-link 390 of a pole and pole-to-pole gap 318 between two facing pole-links 390, 390' are shown in FIG. 3. The pole-link 390 provides a defined area and air gap resulting in a uniform and defined pole-to-pole reluctance. The magnetic equivalent circuit is shown in FIG. 7. An optimal design will sacrifice a small amount of force capability in the interest of reducing rotational losses. It may be desired to have, for example, 85% of the control flux produce force, and 15% of the control flux flow through the pole-links 390. It is a simple matter to compute the poleto-rotor and pole-to-pole reluctances of the equivalent magnetic circuit, and then compute the desired gap 318 and area of the pole-link 390.

The pole-links 390 will now be more clearly described in function by means of the equivalent magnetic circuit of FIG. 7 and mathematical expressions derived from it. In order to have the desired pole-to-rotor and pole-to-pole fluxes, an expression in terms of the ratio of these fluxes is necessary. The expression, called flux allocation ratio, is in terms of pole-to-rotor and pole-to-pole reluctances.

$$\frac{\Phi_{p-r}}{\Phi_{p-p}} = \frac{R_{p-p}}{2R_{p-r}}$$

where $\Phi_{p-r}$ is the magnetic flux pole-to-rotor $\Phi_{p-p}$ is the magnetic flux flowing pole-to-pole $R_{p-p}$ is the net pole-to-pole gap reluctance of a parallel path around a stator $R_{p-r}$ is the net pole-to-rotor gap reluctance of one axis $\frac{\Phi_{p-r}}{\Phi_{p-p}}$ is the flux allocation ratio An expression can be shown in terms of both pole and pole-link dimensions which define their respective areas assuming a constant pole-to-pole gap. However, it is not necessary for the pole-to-pole gaps to be constant for this invention and a more complex expression than the one that follows can be derived.

$$\frac{\Phi_{p-r}}{\Phi_{p-p}} = \frac{g_{p-p} l_{p-r}}{2 g_{p-r} l_{p-p}}$$

where $l_{p-r}$ is the arc length of a pole $l_{p-p}$ is the radial length of a pole-link $g_{p-p}$ is the sum of the pole-to-pole gaps of a parallel path around a stator $g_{p-r}$ is the sum of the pole-to-rotor gaps of one axis The stator 200 in FIG. 2 can have any number of poles with a quantity of four at minimum so as to have at least two axes available to provide two different vectors of control. Typically, two control axes are separated by ninety degrees of rotation about the axis, and there typically is the same number of identical poles for each axis, so that there will be a quantity of poles in multiples of four with half the quantity used for one axis of control, and the rest for the other axis of control. For a particular axis of control, half the quantity of that axis' poles are adjacent to one another with the remaining poles for that axis opposing the first half of the quantity of poles.

A preferred embodiment of the invention is as follows. The stator is divided into a particular geometry with each pole component called a sectored-pole-piece 310 as shown in FIG. 3. The stator is equiangularly divided into as many sectors as there are poles. Each sector, called sectored-pole-piece, is bounded by sector boundaries 315, 320, which are imaginary lines connecting two ends of outer curvilinear surface 335 with a common point 395 which is the center of the rotational axis of a rotor 314. Thus, a plurality of sectored-pole-pieces 310 forms the bulk of the stator. Inner curvilinear surface 340 forms a part of the inner diameter of the stator, while outer curvilinear surface 335 forms the outer perimeter of the sectored-pole-piece. Outer tapered sides 325, 330 coincide with the sector boundaries 315, 320. Inner tapered sides 350, 355 are parallel to the sector boundaries 315, 320 respectively and are spaced a distance of one half the pole-to-pole gap 318 from the respective lines. Sectored-pole-piece centerline 345 divides the sector into two equal areas. Center sides 360, 365 are parallel and equidistant to the centerline 345. Outer sides 370, 375 are surfaces in the same plane perpendicular to the centerline 345. Inner sides 380, 385 are surfaces in a plane parallel to the surfaces 370, 375. The center sides 360, 365 require a radius along the edges which exist from the outer surfaces 370, 375, and inner surfaces 380, 385 to prevent sharp edges from cutting into magnet wire. Magnet wire is wound around the sectored-pole-piece 310 forming a coil to fill in the voids created by the center sides 360, 365, the outer surface 370, 375, the inner surface 380, 385, but leaving a small clearance to the sector boundaries 315, 320. In this embodiment, the sectored-pole-pieces 310 can individually be mounted onto a standard bobbin coil winding machine wherein a better fill factor can be achieved making it practical to wind a precision layer wound coil if desired. For best coil efficiency, the coils will fill the volume of the natural geometric space in which the coils 216, as shown in FIG. 2, will be tapered. After winding, the sectored-pole-pieces 224 are installed into and fastened by bonding or other means to a ring 210 of material which encloses the sectored-pole-pieces 224, forming a complete stator 200. The sectored-pole-piece material can be either solid or laminated soft-magnetic material.

In another embodiment, the stator 200 is a single component made from either solid or laminated soft-magnetic material. The pole-link features are the same as in the preferred embodiment, but the separation at the sectored-pole-piece sides 325 and 330 along the sector boundaries 315, 320 are non-existent. Ring 210 is not necessary in this embodiment.

What is claimed is:

1. A multi-pole homopolar magnetic bearing comprising:

two rotors secured to a rotating member;

two stators, concentrically disposed with respect to said rotors, each stator having a plurality of equiangularly divided sectored-pole-pieces, wherein each sectored-pole-piece, being bounded by sector boundaries, further comprises two pole-links with tapered sides parallel to the sector boundaries;

a plurality of control coils, each coil being wrapped around said sectored-pole-piece;

a first gap between facing pole-links wherein said first gap is a pole-to-pole gap that is sufficiently small so as to increase a uniform rotor flux distribution thereby reducing eddy current and rotational losses and wherein said pole-to-pole gap is bisected by said sector boundary;

a second gap between said sectored-pole-piece and said rotor wherein said second gap is a pole-to-rotor gap; and means for providing bias magnetic flux, said means being disposed between said stators.

2. The multi-pole homopolar magnetic bearing of claim 1 further comprising means for enclosing said sectored-pole-pieces together.

3. The multi-pole homopolar magnetic bearing of claim 1, wherein said magnetic bearing includes a plurality of pole-to-pole gaps.

4. The multi-pole homopolar magnetic bearing of claim 1, wherein said magnetic bearing includes a plurality of pole-to-rotor gaps.

5. The multi-pole homopolar magnetic bearing of claim 1, wherein said sectored-pole-pieces are assembled together to form said stator.

6. The multi-pole homopolar magnetic bearing of claim 1, wherein flux allocation ratio meets the following condition:

$$\frac{\Phi_{p-r}}{\Phi_{p-p}} = \frac{R_{p-p}}{2R_{p-r}}$$

wherein $\Phi_{p-r}$ is the pole-to-rotor flux, $\Phi_{p-p}$ is the pole-to-pole flux, $R_{p-r}$ is the net pole-to-rotor gap reluctance of one control axis and $R_{p-p}$ is the net pole-to-pole gap reluctance of a parallel path around a stator.

7. The multi-pole homopolar magnetic bearing of claim 6, wherein said flux allocation ratio meets the following condition:

$$\frac{\Phi_{p-r}}{\Phi_{p-p}} = \frac{g_{p-p}l_{p-r}}{2g_{p-r}l_{p-p}}$$

wherein $\Phi_{p-r}$ is the pole-to-rotor flux, $\Phi_{p-p}$ is pole-to-pole flux, $l_{p-r}$ is the pole arc length, $l_{p-p}$ is the pole-link radial length, $g_{p-r}$ is the net sum of the pole-to-rotor gaps for one control axis, and $g_{p-p}$ is the net sum of the pole-to-pole gaps of a parallel path around one side of a stator.

8. A multi-pole homopolar magnetic bearing comprising:

two rotors secured to a rotating member;

two stators, concentrically disposed with respect to said rotors, each stator having a plurality of equiangularly divided sectored-pole-pieces being bounded by sector boundaries, wherein each sectored-pole-piece includes an outer curvilinear surface, an inner curvilinear surface, outer tapered sides coinciding with sector boundaries, two pole-links with tapered sides parallel to said sector boundaries, two center sides being parallel and equidistant to a center line, two outer sides being disposed close to said outer curvilinear surface, and two inner sides being disposed close to said inner curvilinear surface and parallel to said outer sides;

a plurality of control coils, one coil being wrapped around said sectored-pole-piece;

a first gap between two facing pole-links wherein said first gap is a pole-to-pole gap that is sufficiently small so as to increase a uniform rotor flux distribution thereby reducing eddy current and rotational losses and wherein said pole-to-pole gap is bisected by said sector boundary;

a second gap between said sectored-pole-piece and said rotor wherein said second gap is a pole-to-rotor gap; and means for providing bias magnetic flux, said means being disposed between said stators.

9. The multi-pole homopolar magnetic bearing of claim 8 further comprising means for enclosing said sectored-pole-pieces together.

10. The multi-pole homopolar magnetic bearing of claim 8, wherein said magnetic bearing includes a plurality of pole-to-pole gaps.

11. The multi-pole homopolar magnetic bearing of claim 8, wherein said magnetic bearing includes a plurality of pole-to-rotor gaps.

12. The multi-pole homopolar magnetic bearing of claim 8, wherein said sectored-pole-pieces assembled together to form said stator.

13. The multi-pole homopolar magnetic bearing of claim 8, wherein flux allocation ratio meets the following condition:

$$\frac{\Phi_{p-r}}{\Phi_{p-p}} = \frac{R_{p-p}}{2R_{p-r}}$$

wherein $\Phi_{p-r}$ is the pole-to-rotor flux, $\Phi_{p-p}$ is the pole-to-pole flux, $R_{p-r}$ is the net pole-to-rotor gap reluctance of one control axis and $R_{p-p}$ is the net pole-to-pole gap reluctance of a parallel path around a stator.

14. The multi-pole homopolar magnetic bearing of claim 13, wherein said flux allocation ratio meets the following condition:

$$\frac{\Phi_{p-r}}{\Phi_{p-p}} = \frac{g_{p-p}l_{p-r}}{2g_{p-r}l_{p-p}}$$

wherein $\Phi_{p-r}$ is the pole-to-rotor flux, $\Phi_{p-p}$ is pole-to-pole flux, $l_{p-r}$ is the pole arc length, $l_{p-p}$ is the pole-link radial length, $g_{p-r}$ is the net sum of the pole-to-rotor gaps for one control axis, and $g_{p-p}$ is the net sum of the pole-to-pole gaps of a parallel path around one side of a stator.

\* \* \* \* \*